United States Patent Office 2,923,594
Patented Feb. 2, 1960

2,923,594
METHOD OF TANNING

Emanuel R. Lieberman, Somerville, and Paul V. Fagan, New Brunswick, N.J., assignors to Ethicon, Inc., a corporation of New Jersey No Drawing. Application May 29, 1958
Serial No. 738,598

14 Claims. (Cl. 8—94.11)

This invention relates to an improved method for tanning catgut. This application is a continuation-in-part of our copending application Serial No. 696,618, filed November 15, 1957, now abandoned.

The primary objects intended to be accomplished in the usual catgut tanning processes are to increase wet strength and in vivo absorption time. Catgut which is untanned has poor wet strength and cannot be used in many surgical procedures because it is absorbed too rapidly and the suture is disintegrated before the wound has had an opportunity to heal properly. For this reason, a type of catgut is manufactured which is treated with so-called "tanning agents," the purpose of which is to combine irreversibly with the gut and form a chemically rearranged protein material which is more resistant to enzymatic attack, retains its initial strength for a longer period of time after being inserted into the body, and thus holds the wound together for a longer time during the wound healing period.

Many theories have been postulated regarding the mechanism of tanning, depending on the tanning agent employed. Vegetable tanning with tannin, for example is believed to be predicated on the ability of the large tannin molecule to fix itself by hydrogen-bonding between its own phenolic groups and the peptide groups of the protein molecule, and to combine its carboxyl group with the side chain amino groups of the protein.

Chrome tanning, which is usually done with chromium salt complexes, is believed to be based on the coordination of the carboxyl and amino groups of the proteinaceous gut with the chromium atom, resulting in the displacement of coordinately combined anionic groups. One disadvantage of chrome tanning resides in the danger attached to the use of heavy metal, which is known to be toxic.

One of the commonly used tanning agents is formaldehyde. This relatively simple and easily obtainable chemical, which apparently forms a reaction product with the free amino groups of the collagenous catgut, is an extremely obnoxious reagent which is difficult to handle, highly irritating, and toxic. Moreover, there have been reports to the effect that it is erratic in its tanning effects on gut and, for this reason, requires carefully controlled conditions to produce desirable results. Finally, it is well known that formaldehyde-tanned catgut leaves much to be desired in dry knot strength properties.

It has now been discovered that tolylene diisocyanate, n-butyl-isocyanate and hexamethylene diisocyanate, in the form of their bisulfite adducts, may be used as tanning agents for catgut. These substances are superior to other commonly-known tanning agents in that they are easy-to-handle, non-irritating, water soluble, crystalline solids. Moreover, and perhaps more importantly, in processes employing these compounds one can obtain a tanned catgut product which has a superior dry knot tensile strength while retaining an in vivo absorption time comparable to that of presently available tanned gut.

In accordance with one embodiment of the novel process, the bisulfite adduct of tolylene diisocyanate, n-butyl-isocyanate or hexamethylene diisocyanate is dissolved in water in an amount varying between about 0.25% and about 5%, preferably about 1%, and the catgut, in a ratio from about 1:1 to about 1:100, preferably about 1:10, based on the ratio of dry weight of gut to volume of tanning solution (advantageously in the form of ribbons of suitable length) is submerged in the solution. The gut is kept immersed in the solution for a period from about fifteen minutes to about twelve hours or more, preferably about three hours. It is then removed, washed, and converted into string by conventional methods.

The surprising feature of our novel process rests on the fact that the isocyanate reacts with the catgut even though it is present in an aqueous system. Under these conditions one would normally expect that the isocyanate would react with the aqueous phase, which is in a large excess as compared with the amount of catgut. The application of heat is not only unnecessary, but also injurious to the gut.

It is to be noted that the novelty of the process resides in the use of tolylene diisocyanate, n-butyl-isocyanate and hexamethylene diisocyanate in the form of their bisulfite adducts. None of these isocyanates can be conveniently employed as such as tanning agents, since they are lachrimatory, water-insoluble and extremely difficult to handle. It is to be understood, furthermore, that the term tolylene diisocyanate as used in this invention is intended to mean any one or a mixture of the available isomers of tolylene diisocyanate, i.e. the 2,4 isomer, the 2,6 isomer, etc. It will be observed also that although the examples below illustrate the preparation of sodium bisulfiite adducts, other alkali metal bisulfite adducts, e.g. potassium bisulfite adduct, may be prepared in a like manner.

It is usually more convenient to conduct the tanning operation at room temperature, i.e. from about 20° C. to about 25° C., although the temperature of the mass may be slightly increased to from about 30° C. to about 40° C. in order to accelerate the reaction and thus reduce the time requirement. Obviously, however, care must be exercised not to exceed this temperature range since excessive wet heat will cause irreversible degeneration of the catgut suture.

PREPARATION OF TOLYLENE DIISOCYANATE-SODIUM BISULFITE ADDUCT

To a solution of 40 grams of sodium bisulfite in 60 ml. of water contained in a 250 ml. flask fitted with a stirrer and thermometer are added 27 grams of tolylene diisocyanate. The temperature is maintained at or below 25° C. during the reaction. After one-half hour, the mixture thickens and heat is evolved. Stirring is continued for an additional one and one-half hours, after which time 60 ml. of water are added. When all the solid has dissolved, the solution is filtered. Methyl alcohol is added to the filtrate until the precipitation of tolylene diisocyanate-sodium bisulfite is complete. The solid is filtered, washed thoroughly with methanol, and dried in a vacuum desiccator over phosphorus pentoxide to remove any traces of moisture still present. Yield 57 grams.

In the same manner, using hexamethylene diisocyanate as the starting material, the hexamethylene diisocyanate-sodium bisulfite adduct is prepared.

PREPARATION OF n-BUTYL ISOCYANATE-SODIUM BISULFITE ADDUCT

To a solution of 12.5 grams sodium bisulfite (25% excess) in 50 ml. of water is added 9.9 grams (0.1 mole) of n-butyl-isocyanate. The mixture is stirred rapidly for two hours at room temperature. To the clear solution are added 10 ml. of saturated sodium bisulfite solution. Crystallization of the salt is complete after storage overnight at 10° C. The precipitate is filtered, washed with acetone and dried in a vacuum desiccator over phosphorus pentoxide.

Example I

Seventy ribbons of catgut, six feet each in length (sixteen grams of collagen, based on dry weight) are immersed in a 200 ml. volume of each of 0.1%, 1% and 5% aqueous solutions of tolylene diisocyanate sodium bisulfite adduct for a period of three hours at room temperature (20–25° C.). Similar lengths of catgut ribbon are used as controls. The ribbons are removed, dried, spun into strings, wound on reels, sterilized, tubed in 90% isopropyl alcohol, and aged for two weeks.

In a like manner seventy ribbons of catgut, six feet each in length (sixteen grams of collagen, based on dry weight) are immersed in a 200 ml. volume of each of 0.1%, 1% and 5% aqueous solutions of n-butyl-isocyanate bisulfite adduct for a period of three hours at room temperature (20–25° C.) using similar lengths as controls. After the tanning is complete, the ribbons are treated as described above.

Samples of each of the tolylene-diisocyanate-treated catgut strings were tested for dry knot and wet knot tensile strengths on the Scott inclined plane tester. The results are shown below. Tensile strength is expressed as the ratio between the average tensile strength in pounds and the diameter of the string in mils. "P.D., hrs." represents protein digestion time, as determined by the following procedure:

A 100 ml. volume of a buffer solution containing 174.22 grams dibasic potassium phosphate and 38.15 grams sodium borate made up to one liter of water is mixed with 76 grams thiourea, 800 ml. distilled water and 30 grams papain. Just prior to testing, a 1 ml. volume of an activator made by dissolving 5.2 grams sodium bisulfite in water up to a 100 ml. volume is added to 24 ml. of the buffered papain solution. The catgut string to be tested is immersed under twenty grams of tension in the activated and buffered papain solution, which is maintained at an incubation temperature of 37.8° C. The period of time required for the catgut to be completely digested, expressed in hours, represents papain digestion time.

TABLE I

| TDI-BS¹ Conc'n in Tanning Bath, percent | No. of Samples | Tensile Strength, T.S./d. | | Percent Change Over Untreated Controls | | P.D., Hrs. |
|---|---|---|---|---|---|---|
| | | Dry Knot | Wet Knot | Dry Knot | Wet Knot | |
| 0.0 | 90 | .280 | .188 | | | 2.4 |
| 0.1 | 60 | .276 | .226 | +1.4 | +20.2 | 8.6 |
| 1.0 | 60 | .306 | .241 | +9.3 | +28.2 | 8.8 |
| 5.0 | 60 | .292 | .232 | +4.3 | +23.4 | >94 |

¹ Tolylene diisocyanate sodium bisulfite adduct.

It will be seen from the results shown above that tolylene diisocyanate sodium bisulfite is an excellent tanning agent, the treated catgut showing a marked increase in dry knot tensile strength and enzymatic digestion time over the untreated control.

Example II

The effect of tolylene diisocyanate sodium bisulfite on catgut under varying conditions of concentration and time, was determined. The ratio of catgut to volume of solution was the same as that used in Example I.

TABLE II

| TDI-BS Conc'n in Tanning Bath, Percent | Tannage Time, Hrs. | Lbs. Tensile Strength Dry Knot | P.D., Hrs. |
|---|---|---|---|
| 0.0 | | 3.24 | 3.0 |
| 0.5 | 3 | 3.51 | 1.7 |
| 0.5 | 16 | 3.61 | 2.7 |
| 1.0 | 3 | 3.58 | 3.1 |
| 1.0 | 16 | 3.62 | 3.9 |

Example III

In another series of tests, the effect of tolylene diisocyanate sodium bisulfite on catgut under varying conditions of concentration and time was determined. This series includes results on the wet knot, as well as dry knot, strengths. The results are shown in Table III.

TABLE III

| TDI-BS Conc'n in Tanning Bath, Percent | Tannage Time, Hrs. | Lbs. Tensile Strength | | P.D., Hrs. |
|---|---|---|---|---|
| | | Dry Knot | Wet Knot | |
| 0.0 | | .280 | .188 | 2.4 |
| 0.5 | 3 | .308 | .247 | 6.6 |
| 0.5 | 16 | .301 | .227 | 4.6 |
| 1.0 | 3 | .323 | .257 | 11.7 |
| 1.0 | 16 | .298 | .242 | 20.0 |

Example IV

Seventy ribbons of catgut, six feet each in length (sixteen grams of collagen, based on dry weight) are immersed in a 200 ml. volume of a 2% aqueous solution of hexamethylene diisocyanate sodium bisulfite adduct for a period of three hours at room temperature (20–25° C.). Similar lengths of catgut ribbons are used as controls. The ribbons are removed, washed with water, spun into strings, dried, wound on reels, sterilized, tubed in 90% isopropyl alcohol, and aged for two weeks.

In a like manner, seventy ribbons of catgut, six feet each in length, are treated with a 2% aqueous solution of hexamethylene diisocyanate sodium bisulfite adduct and the resulting ribbons are removed, spun directly into strings without water washing, dried, wound on reels, sterilized, tubed in 90% isopropyl alcohol and aged for two weeks.

Both the washed and unwashed sutures were tested for tensile strength properties in accordance with the procedure described above. The results are shown in Table IV.

TABLE IV

| HMD-BS* Conc'n in Tanning Bath, Percent | No. of Samples | Tensile Strength, T.S./d. | |
|---|---|---|---|
| | | Dry Knot | Wet Knot |
| 0 (control) | 90 | .247 | .178 |
| 2 washed | 90 | .274 | .214 |
| 2 unwashed | 90 | .283 | .210 |

*Hexamethylene diisocyanate sodium bisulfite adduct.

What is claimed is:

1. In a method for preparing collagen sutures, the improvement which comprises treating catgut with an aqueous solution of an alkali metal bisulfite adduct of a compound selected from the group consisting of tolylene diisocyanate, hexamethylene diisocyanate and n-butyl-isocyanate at a temperature up to about 40° C.

2. A method as set forth in claim 1 wherein the concentration of the alkali metal bisulfite adduct is from about 0.25% to about 5%.

3. In a method for preparing collagen sutures, the improvement which comprises treating catgut with an aqueous solution of an alkali metal bisulfite adduct of a compound selected from the group consisting of tolylene diisocyanate, hexamethylene diisocyanate, and n-butyl-isocyanate at a temperature up to about 40° C., the ratio of catgut to volume of solution being 1:10 on a dry weight basis.

4. A method as set forth in claim 3 wherein the concentration of alkali metal bisulfite adduct is from about 0.25% to about 5%.

5. A method as set forth in claim 3 wherein the treatment is carried out at room temperature.

6. In a method for preparing collagen sutures, the improvement which comprises treating catgut with an aqueous solution of tolylene diisocyanate sodium bisulfite at a temperature up to about 40° C.

7. A method as set forth in claim 6 wherein the concentration of tolylene diisocyanate sodium bisulfite is from about 0.25% to about 5%.

8. In a method for preparing collagen sutures, the improvement which comprises treating catgut with an aqueous solution of n-butyl-isocyanate sodium bisulfite at a temperature up to about 40° C.

9. A method as set forth in claim 8 wherein the concentration of n-butyl-isocyanate sodium bisulfite is from about 0.25% to about 5%.

10. In a method for preparing collagen sutures, the improvement which comprises treating catgut with an aqueous solution of hexamethylene diisocyanate sodium bisulfite at a temperature up to about 40° C.

11. A method as set forth in claim 10 wherein the concentration of hexamethylene diisocyanate sodium bisulfite is from about 0.25% to about 5%.

12. In a method for preparing collagen sutures, the improvement which comprises treating catgut with an aqueous solution of tolylene diisocyanate sodium bisulfite in a concentration of about 1%.

13. In a method for preparing collagen sutures, the improvement which comprises treating catgut with an aqueous solution of n-butyl-isocyanate sodium bisulfite in a concentration of about 1%.

14. In a method for preparing collagen sutures, the improvement which comprises treating catgut with an aqueous solution of hexamethylene diisocyanate sodium bisulfite in a concentration of about 2%.

References Cited in the file of this patent
UNITED STATES PATENTS

| | | |
|---|---|---|
| 2,523,326 | Putnam | Sept. 26, 1950 |
| 2,710,816 | Evans et al. | June 14, 1955 |